United States Patent [19]

Petrek et al.

[11] 4,402,793

[45] Sep. 6, 1983

[54] MULTIPLE EFFECT THIN FILM DISTILLATION SYSTEM AND PROCESS

[76] Inventors: John P. Petrek, 235 Green Ave., Escondido, Calif. 92025; Clifford M. Cantrell, 606 Coast Ave., Richland, Wash. 99352

[21] Appl. No.: 319,724

[22] Filed: Nov. 9, 1981

Related U.S. Application Data

[62] Division of Ser. No. 122,243, Feb. 19, 1980, Pat. No. 4,329,204.

[51] Int. Cl.³ .............................................. B01D 3/02
[52] U.S. Cl. .................................... 202/174; 202/234; 202/236; 203/10; 203/72; 203/89; 203/DIG. 1
[58] Field of Search ....................... 203/10, 11, 21–27, 203/71, 72, 89, DIG. 17, DIG. 24, DIG. 1; 159/5, 17 R, 1 W, DIG. 32; 165/DIG. 19, 46, 166, 167, 17 R, 17 P, 17 C, 18, 20 R, 20 CS; 202/117, 185 A, 232, 234, 235, 236, 174, 205; 126/270, 271

[56] References Cited

U.S. PATENT DOCUMENTS 3,785,931 1/1974 Coffey et al. ................. 203/DIG. 1
3,788,954 1/1974 Cantrell ................................. 203/89

OTHER PUBLICATIONS

"Solar Energy Digest", vol. 6, No. 6; 1976.

Primary Examiner—Frank Sever
Attorney, Agent, or Firm—Brown & Martin

[57] ABSTRACT

A multiple effect diffusion distillation system includes a plurality of parallel plates for continuous recovery of heat having opposed evaporation and condensation faces for alternately evaporating and condensing phases of a liquid fed on to the upper end of the plates in a thin film for gravity flow along the evaporator face of the plates with vapor condensing on the condensation faces and with means for collecting and recovering the condensed product from the system. Alternate embodiments including a solar heat input system and others include multiple modular systems.

20 Claims, 13 Drawing Figures

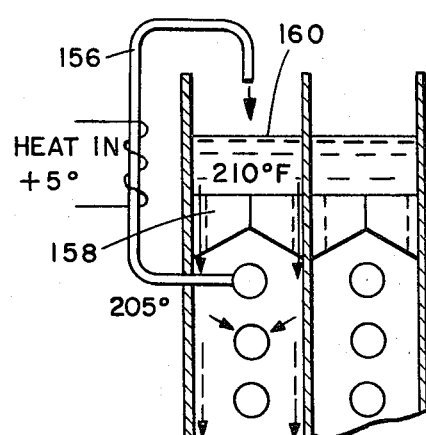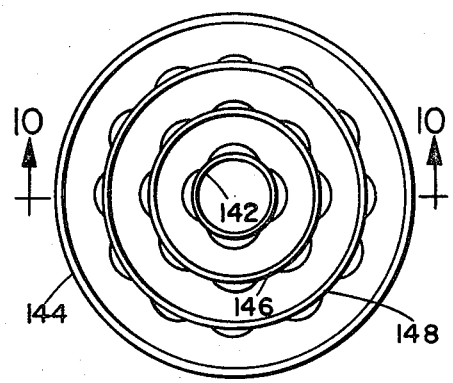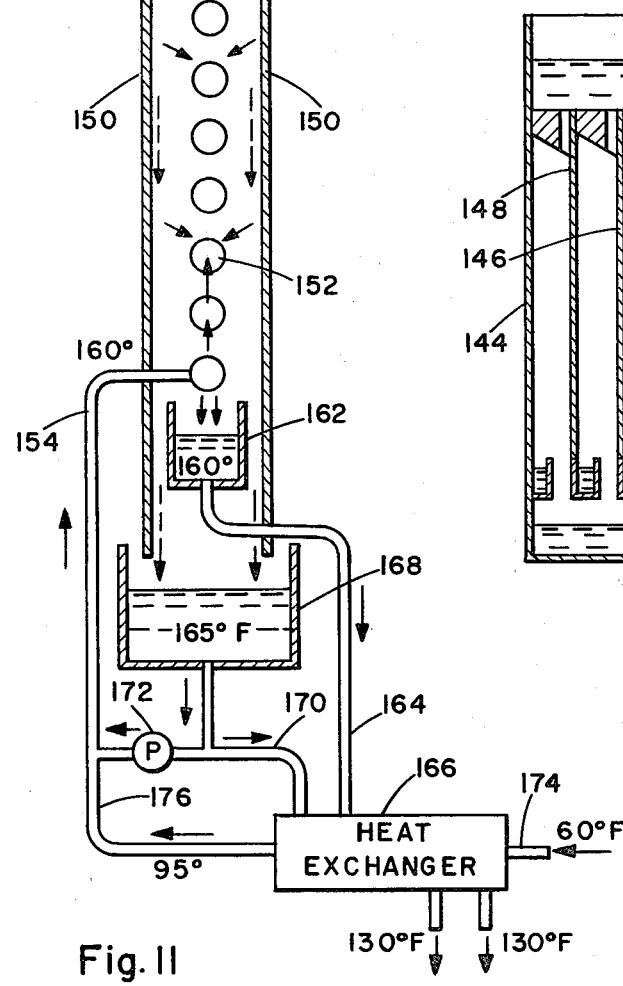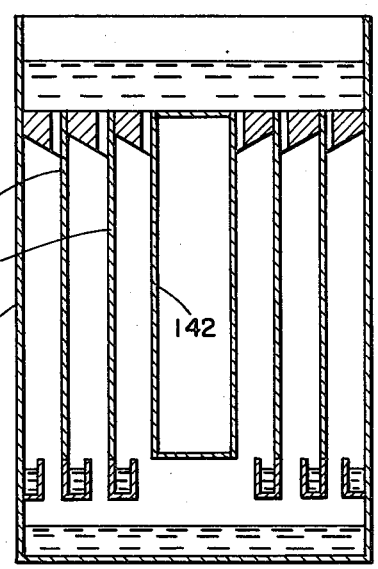
Fig. 9
Fig. 10
Fig. 11

MULTIPLE EFFECT THIN FILM DISTILLATION SYSTEM AND PROCESS

This is a division of application Ser. No. 122,243, filed Feb. 19, 1980, now U.S. Pat. No. 4,329,204.

BACKGROUND OF THE INVENTION

The present invention relates to distillation systems and pertains particularly to multiple effect distillation systems.

The use of a distillation process, that is evaporation and condensation of the vapors, for the separation of binary phase and multiple phase liquids have been known for some time. Most commercial distillation systems utilize a simple boiler for bringing the liquid to its boiling point to vaporize the liquid and draw off the vapor into a condenser where it is condensed and recovered. Such systems are satisfactory for many applications where the cost of energy is not a factor. Such systems, however, require a considerable amount of energy in order to properly function.

Other commonly known distillation systems are discussed and described in the background of U.S. Pat. No. 3,788,954 issued Jan. 20, 1974 to Mr. C. M. Cantrell, co-inventor hereof. The aforementioned patent covers a novel additional approach to the separation of liquid phases. That patent discloses and is directed to an interphase mass transfer process from laminer flowing thin films.

Many areas of the world and even areas of the United States have inadequate supplies of fresh or potable water. Although salt water is available in many of these areas, economical and effective means of converting it to fresh water is not available. Distillation is one method available for recovering fresh water from salt water. The prior art distillation systems are not sufficiently effective and economical to solve this problem.

We have conceived and developed a multiple effect diffusion distillation process that is easily adaptable to many different sources of energy. The broad aspects of a solar multiple effect distillation system were disclosed in my article dated June, 1976, appearing in volume 6, No. 6 of Solar Energy Digest, published by CWO-4, William B. Edmonson, San Diego, California. Since that time we have developed the system as well as numerous improvements which enhance the efficiency of that system as well as other applications of the multiple effect distillation system.

The multiple effect distillation system of the present invention has been found to be highly energy efficient as well as compact and simple to manufacture and operate.

SUMMARY AND OBJECTS OF THE INVENTION

It is therefore the primary object of the present invention to overcome the above problems of the prior art.

Another object of the present invention is to provide a simple and inexpensive liquid phase separation system.

A further object of the present invention is to provide a simple and inexpensive liquid phase distillation system which is simple and inexpensive to manufacture and is energy efficient to operate.

In accordance with the primary aspect of the present invention, a multiple effect diffusion distillate system includes a plurality of closely spaced parallel transfer plates defining a plurality of vapor chambers having opposed evaporating and condensing faces and for establishing a heat flux across the plurality of plates with the plates disposed at an angle to the horizontal to enable gravity flow of a liquid along the faces of the plates from an upper edge to a lower edge with means for feeding and controlling a thin film liquid onto the evaporating face and means for removing the separated liquid at the lower end of the plates.

BRIEF DESCRIPTION OF THE DRAWINGS

The above and other objects and advantages of the present invention will become apparent from the following description when read in conjunction with the drawings, wherein:

FIG. 9 is a top plan view of a still further embodiment.

FIG. 10 is a sectional view taken on line 10—10 of FIG. 9.

FIG. 11 is a diagrammatic view showing details of a heat exchanger and cooler for certain embodiments of the invention.

DETAILED DESCRIPTION OF PREFERRED EMBODIMENTS

Figure 2:
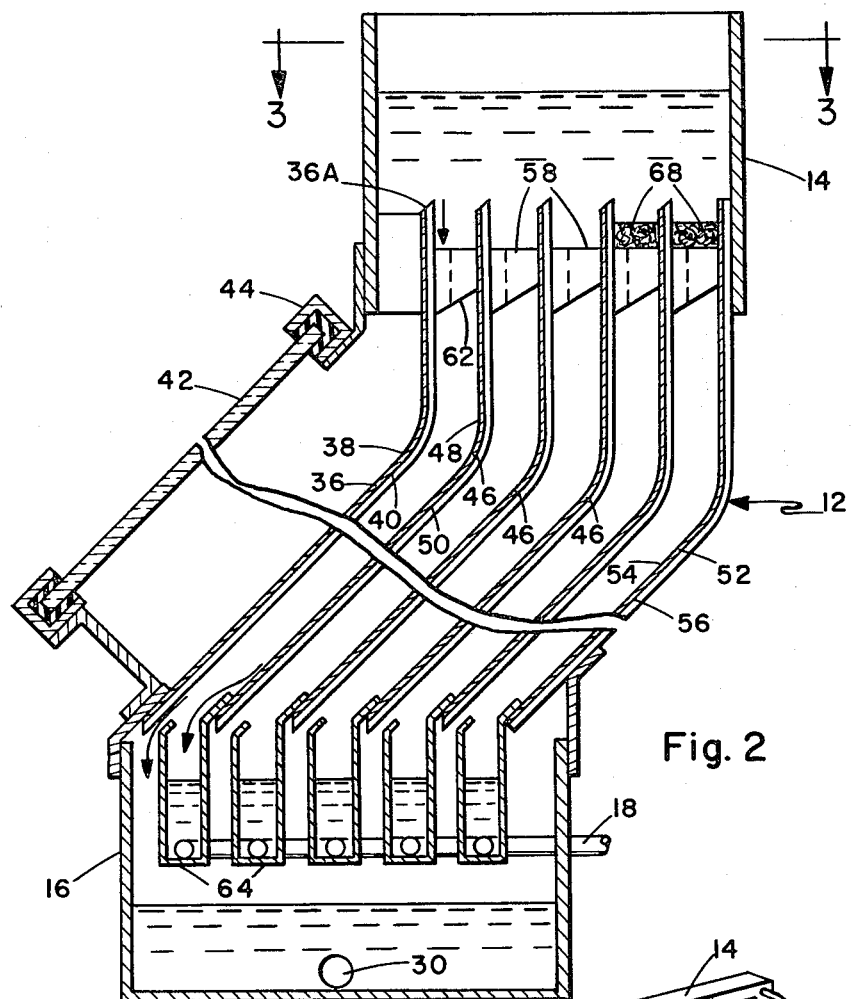
FIG. 2 is a side elevational view with parts in section.

The methods and apparatus of the present invention are directed to the separation of components of a fluid, primarily liquids. In its simplest form the invention involves the evaporation of the more volatile components of the fluid and the collection and condensation of the vapors, thereby separating the more volatile component from the other components of the liquid or fluid.

The invention can be utilized for the separation of liquids having multiple components of different volatility such as alcohol and water, or the various phases of a hydrocarbon such as crude, as well as for the separation of potable water from brackish and seawater.

The invention in its broadest aspects includes the establishment of opposed parallel evaporation and condensation plates defining multiple adjacent vapor chambers and establishing a temperature gradient across the chambers from a heat input side to a heat output side. The walls of the chambers defining the opposed evaporation and condensation faces are disposed at an angle to permit gravity flow of a thin film down the surface of the evaporator plate, and the flowing of the condensate from the face of the condensation plate into collection troughs.

Techniques and methods and apparatus of the invention are utilized and arranged to establish a temperature differential for driving the distillation process in a continuous fashion. The system and process is arranged for continuously utilizing the heat input to the system with minor heat losses resulting in very high efficiency and production rates from the system.

A number of effects can be essentially defined as the number of chambers defined in this system through which a given amount of heat flows during the separation process. The number of effects can also be defined as the number of heat or energy utilizations in the system. The temperature gradient or heat flux across the unit will be determined or established by the number of effects of the system.

In essence, the structure of the invention comprises a series of vapor chambers or effects disposed adjacent to one another having common walls and through which the heat of the system or process flows in the process of vaporizing and condensing the liquids within or passing through the system. The heat introduced into the system acts to vaporize a portion of the first layer of film on the first vaporizing or evaporation plate and that heat is transferred by condensation on the adjacent plate for vaporizing a portion of the liquid in that chamber. This process continues throughout the various chambers or effects in a bank or unit of the distillation system. The energy introduced into the system is repeatedly re-used as it passes from plate to plate throughout the system.

Various parameters within the system can be varied to vary the rate and volume of production in proportion to the heat input. Certain parameters have been found to be critical and/or have critical ranges in order for the system to properly function. The system balances the heat and fluid input and provides an essentially balanced system. Vapor is transferred from plate to adjacent plate by diffusion through the gas that is inherently present with the distillation process. Each chamber is maintained at atmospheric pressure by allowing air to exist in the chambers. The partial pressure of water reduces with lowering of temperature, but partial pressure of air increases to maintain atmospheric pressure conditions. This type system therefore requires no pressure control for operation and for construction considerations.

Figure 1:
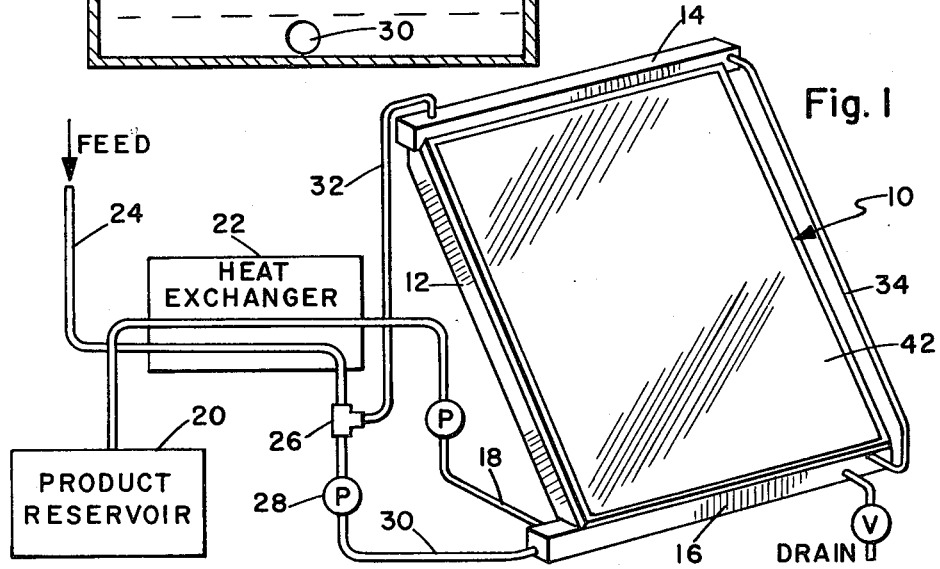
FIG. 1 is a diagrammatic view of a solar distillation unit.

Turning to the drawings there is illustrated by way of example in FIG. 1 a solar distillation system in accordance with the invention. The system of FIG. 1, designated generally by the numeral 10, consists essentially of a modular unit 12 comprising multiple effects or chambers having a solar collection surface or face on one side and a heat rejection or radiation face or plate on the opposite side or face. At the upper end of the unit, a feed reservoir or trough 14 communicates with and feeds a liquid onto the backside or evaporator face of the plates into the various chambers of the system. A collection and separator unit 16 collects the separated liquids at the bottom or lower end of the unit 12 and communicates the product reservoir 20. In a preferred form the product liquid is passed through the heat exchanger 22 for transferring heat therefrom to a feed water source, or source of liquid fed into the system by way of conduit 24, which is then mixed with any recycle fluid at juncture 26 for feeding back into the feed reservoir 14 of the system. A pump 28 recycles a portion of the feed stock drawn thereto by way of conduit 30. This is all fed back into the feed reservoir by way of conduit 32. In the simplest form of the invention an overflow line or conduit 34 is provided to simply maintain a constant level of fluid within the feed reservoir 14. This eliminates complicated controls from the system, thus providing a simple inexpensive system.

Turning to FIG. 2 of the drawings, a preferred construction of the unit 12 of the system is illustrated. As shown in FIG. 2 unit 12 includes a solar collection or heat input plate 36 having a blackened solar collection face 38 and an evaporator face 40. A transparent sheet of glass or similar glazing material 52 covers the first sheet 36 thereby defining what is typically termed a glazed flat plate collection solar panel. The glass 42 is mounted in a suitable rectangular frame or bracket 44 with the usual sealing and insulating materials as preferred.

Spaced adjacent to and extending parallel to the plate 36 is a plate 46 having a condensing face 48 and an evaporator face 50. The plate 36 and 46 extend parallel and present opposed evaporation faces 40 and collection faces 48 thereby defining a vapor chamber therebetween.

A plurality of the plates 46 are stacked between the heat input plate 36 and a heat output plate 52. This defines a plurality of effects or vapor chambers between the input side and output side of the unit. The heat output plate 52 includes a condensing surface 54 for radiation for air cooling or may be incorporated in a heat exchanger for transferring the heat therefrom for disposal or to introduce as pre-heat into the feed water for the system as will be explained.

First of all it will be appreciated that for a distillation system utilizing a solar system built into the distillation system the plates will be preferably disposed an an angle to the horizontal to obtain the maximum benefit of the solar rays. Preferably the plate 36 will be tilted at right angles to the sun for maximum absorption of solar energy. The remaining plates will be similarly disposed at a similar angle. The plates however, are oriented somewhat vertically such that gravity flow of the liquid will take place on the surfaces of the plates. The plates are formed and extend between the feed water and collection chamber or reservoir such that the liquid is appropriately passed therebetween.

The plates are preferably formed to have a vertically extended upward end to ease the flow of liquid onto the back surface or evaporation face of the plates.

The system is provided with means for flowing the liquid onto the back of the plates in a thin film. The illustrated approach includes the curving of the upper end 36a of plate 36, for example, to extend vertically with similar upper ends of the plates 46 and the plate 52. The upper end of the plate extends into a position or into the bottom of the feed through 14.

Figure 3:
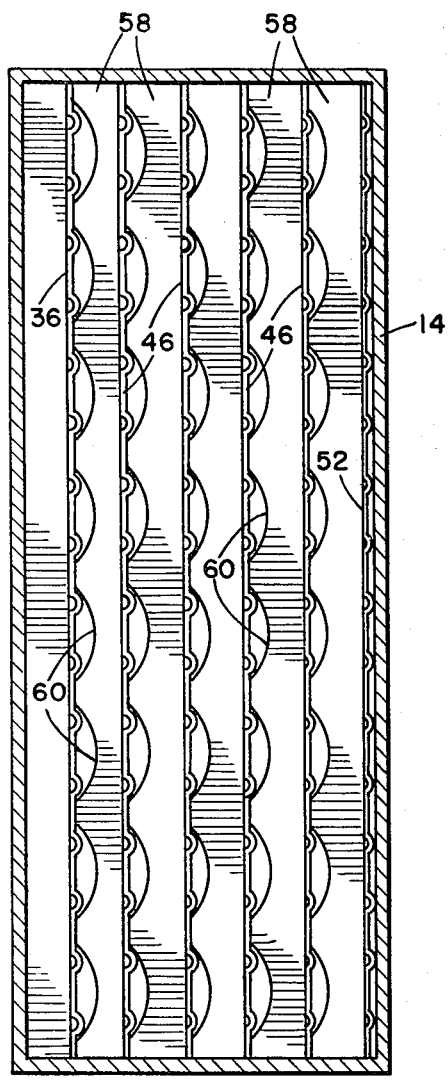
FIG. 3 is a view taken generally on lines 3—3 of FIG. 2.

Turning to FIG. 3, there is illustrated a top view of the embodiment of FIG. 2 illustrating the means for controlling the flow of the liquid or water onto the back side of the plate. In this arrangement a plurality of identical spacers 58 are disposed between the respective plates. These spacers include a plurality of passageways or channel 60 extending from the reservoir 14 along the backside of the respective plate to the lower end of the spacers. Any form of communication or passageway which opens at its lower end onto the back side of the plate with means for preventing flow of the liquid onto the opposing face of the next adjacent panel would be satisfactory. In the instant arrangement the lower edge 62 of the spacer 58 is sloped upward from the side edge engaging the back side 40 of plate 46. Since water does not uphill, this prevents the flow of water across the spacer from the passageway onto the adjacent plates. The rate of flow of the water onto the evaporation face of the plate is critical and may be controlled by means of the passageway size and/or other means.

Means for catching or collecting the condensate at the lower end of the condensing surface includes a tray or trough 64 at the lower end of each of the condensing surfaces having an upper opening with one wall extended up spaced therefrom and spaced from the back side or evaporation face of the adjacent plate. The film of water on the evaporation face of the plate flows down the plate to and off the lower end thereof and into a reservoir 16. The condensate on the condensing face of the plate flows downward along the face and into the collection tray or trough 64. These trays then convey the condensate or product into a collection manifold and then to suitable storage or the like.

In operation of the device, it is set up to receive solar energy onto the face 38 of plate 36. A liquid to be distilled, such as salt water for example, is pumped onto the feed reservoir 14 and a controlled flow of the water is passed onto the back side of the plates 36, 48 in a thin film. This thin film of water on the face 40 of plate 36 receives the heat transmitted through the plate 36 from the face 38 as it flows downward, and the temperature of the thin film increases in proportion to the heat directed thereto and begins to vaporize into the vapor chamber or space between plates 36 and 46. The vapor passes by diffusion to plate 46 condensing on the face 48 of plate 46 transferring the heat of vaporization thereto upon condensation. The heat of vaporization from this process passes through plate 46 to the face 50 thereof and into the thin film of water passing therealong. This thin film of water receiving the heat through plates 46 begins to vaporize reaching a stable condition sending off vapor into and across the space between the plates. This vapor between the plates passes across the space and condenses onto the face of the next adjacent plate 46 which is cooler. This process continues throughout the system. The system reaches an equilibrium condition with a temperature differential between the input and output side causing the flow of heat through the system.

The film of water flowing on the back side of plates 36 and 46 is fed at a rate proportioned to the output thereof to assure that a continuous flow or film of the fluid will remain on and flow off the end of the lower edge of the plate. This continuous film is important to maintain a continuous exposure and a small mass of the water for vaporization. The close spacing of the plates also reduces the distance that vapor must travel to the condensing face. This continuous flow off the end of plate is also important in salt water distillation in that it continuously flushes the system preventing (or at least greatly reducing) the precipitation of the salt onto the surface of the plate.

The space between the plates 36, 46 and adjacent plates has been found to be critical to obtain optimum performance. A range of from ⅛ inch to ½ inch space between plates has been found preferrable for water distillation. The space affects mass transfer, i.e. transfer rate of vapor across the space. For other conditions and for certain liquids a spacing of up to one or two inches may be practical.

I have found that the use of pressures lower than atmospheric pressure can increase the efficiency of the system by reducing the resistance of the vapor flow across the space. This increase in mass transfer is the result of reduction of the partial pressure of air thereby reducing vapor flow resistance. In other words, a vacuum within the system would permit a higher rate of mass transfer of the vapors between the plates. In addition, the temperatures within the system necessary for vaporization of the water would be lower.

However, we have found that the use of pressures higher than atmospheric pressure can increase the efficiency of the system by increasing the number of stages. This increase is the result of increasing the temperature range between the first and last plates.

Other modifications can include provision of an atmosphere of gasses other than air, such as helium for example. It has been found that the use of helium will also speed this mass transfer rate and significantly affect the efficiency of the system. Helium would increase the mass transfer rate (or heat flux) by a factor of approximately 3.4.

Figure 4:
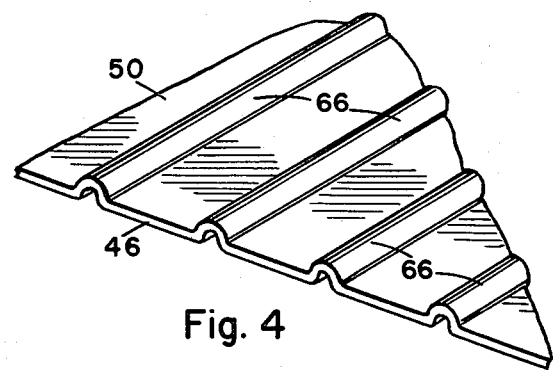
FIG. 4 is a detailed view of a portion of a plate of the invention showing details of the structure.

For a simplified system however, the simple atmospheric conditions have been found to be satisfactory and provide a highly workable system. The construction of the plates to assure the thin film thereon is illustrated in FIG. 4. As illustrated, the plate 46, for example, is provided with a plurality of ridges 66 extending upward from the face 50 thereof. This construction forces the water to spread out in a thin film between the ridges across the entire width of the plate. The ribs should be at a space to insure that the water will spread out between the ribs in a thin film. It is essential to maintain a thin film of water along the entire plate surface in order to maintain efficiency of the system. An optimum spacing of the ribs has been found to be from between ⅛ inch and 3/16 inch between the ribs. The height of the ribs are also found to be about 0.015 inches high and about 0.015 inches wide. The rib can be formed either as a crease in the plate, as a ridge on the face of the plate, or simply as an added strip such as a thin string or wire bonded to the face of the plate.

The plates are preferably made of a high heat conducting material to also enhance the efficiency of the system. Suitable materials for the plates include copper, aluminum, stainless steel and similar materials which would each have certain advantages and disadvantages include the lower heat conducting capabilities.

The film thicknesses of the mass of water on the plate's evaporative face should be on the order of approximately 0.005 inches over the entire plate. The thin film reduces the mass of liquid that must be heated in order to induce vaporization. The thin film in a spread out condition exposes the water flow to a large area upon which evaporation is dependent. The thickness of the film (less than 0.005 inches should be maintained to allow the liquid film to quickly adjust in temperature to create a temperature gradient from plate to plate.

One approach to the control of the feeding of the film down the face of the plates is the use of a wick 68 disposed between the upper end of the plates in the trough at the openings to the passageways 60. The width material can be selected to provide the appropriate feed rate of the water onto or through the system. In the simplified version of the solar system, water is maintained in the feed reservoir at a minimum level by use of a simple overflow line which returns flow of water to the lower reservoir.

In operation of the device for distillation of the seawater and the like, a certain portion of the concentrated discharge brine is continuously drawn off from the waste reservoir. With a solar system of about 12 feet long, it has been found that approximately 8 to 10% of the water is evaporated from the distillation surface upon each pass through the system. This can be increased with increased heat flux or energy input. Thus, with higher heat flux systems a higher percentage of the water can be evaporated with each pass. In some systems, the evaporation can be as much as 50% of the feed water. These parameters can be varied with the heat input at the feed input plate 36, as well as the temperature of the feed water as it is fed into the system. Preheating of the water by means of the heat exchanger from the product produced from the system can be result in the continuous use of recovered energy in the system. Thus, the system becomes highly heat efficient and cost effective.

The number of plates in the system as previously explained can vary with the system. For a solar system, the number of plates and thus effects in the system can be as high as 40 or more for operations in atmospheric conditions and can be increased under other conditions. The transfer or diffusion of the water vapor into the air and across the space between the plates substantially follows the following formula:

$$m = (DP_o/1TR) \ln[(P_o - P_1)/(P_o - P_2)]$$

Where:
- $D$ = Diffusivity (ft$^2$/hr)
- $1$ = Diffusion distance (ft)
- $T$ = Temperature (°R)
- $R$ = Constant = (85.74 ft-lb$_f$/lb$_m$°R)
- $P_o$ = Atmospheric pressure = (2116 lb/ft$^2$)
- $P_1$ = Vapor press. cond. surface (lb/ft$^2$)
- $P_2$ = Vapor press. vaporiz. surface (lb/ft$^2$)
- $m$ = Vapor mass flow (lb/hr-ft$^2$)

Figure 6:
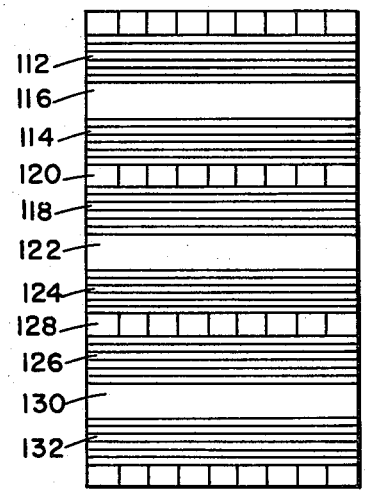
FIG. 6 is a top plan view of a multiple bank system.
Figure 5:
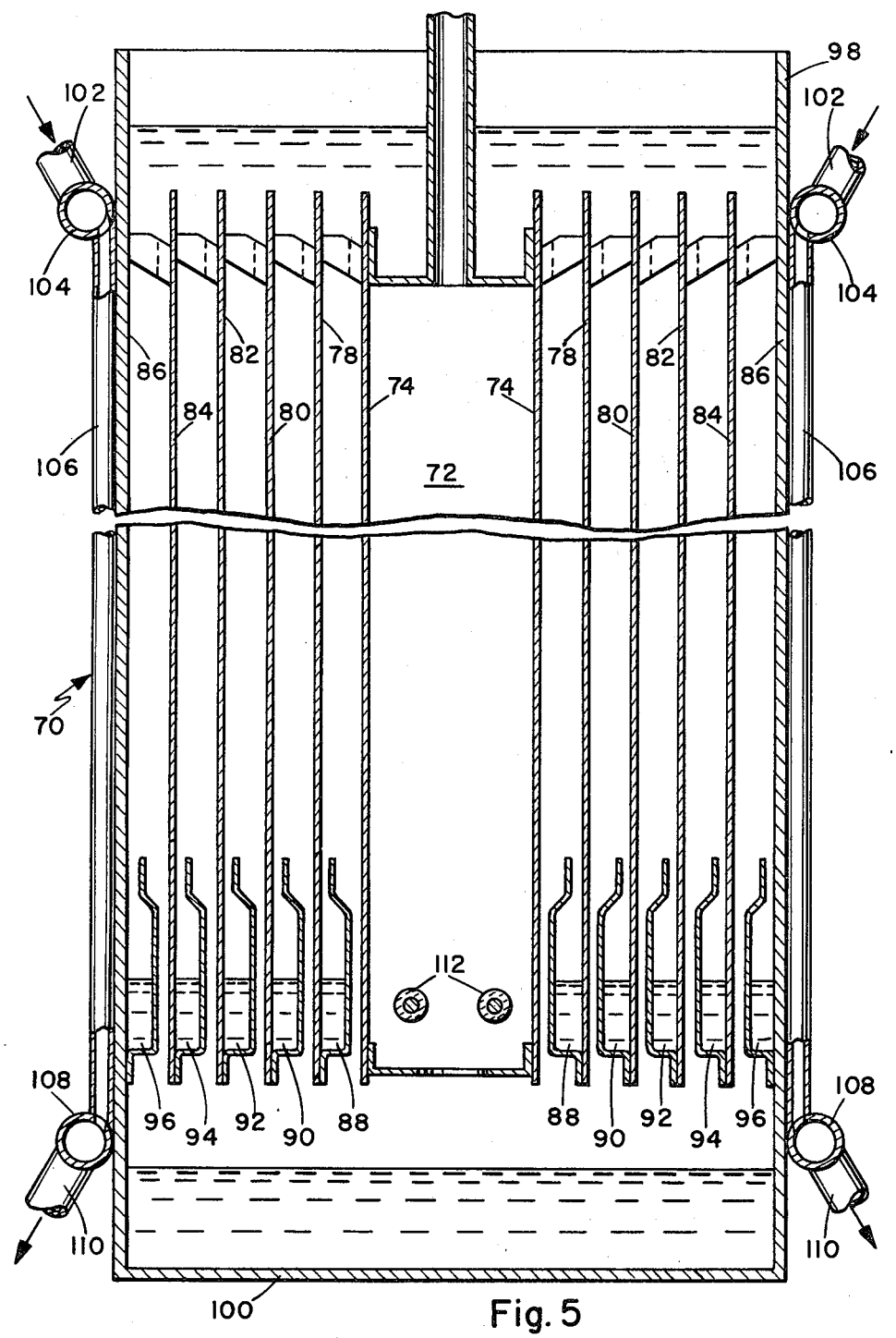
FIG. 5 is a side elevational view in section of an alternate embodiment of the invention.

Turning now to FIG. 6 there is illustrated a distillation system embodying the present invention which utilizes conventional source of heat such as that from electrical energy, fossel fuels, geothermal, thermochemical, waste heat from generating plants such as nuclear and other plants. As illustrated in FIG. 5, the device designated generally by the numeral 70 is shown in side elevational view in section illustrating the essentials of the system. In this embodiment the device is constructed basically to form a housing having a central heat chamber 72 which is formed between a pair of opposed heat input plates 74. The construction is essentially symmetrical about the central heat input chamber 72 and thus only one side of the system need to described in detail.

As in the previously described embodiment, the distillation unit comprises a plurality of closely spaced plates 78, 80, 82 and 84 disposed between the heat input plate 74 and the heat output plate 88. The heat input plate 74 as in the previously described embodiment has an evaporation surface which is in opposed relationship and extends parallel to a condensing face of plate 80. The plate 80 similarly has an evaporation face on the back side thereof which is in opposed relationship to the similarly disposed or opposed condensation face of plate 84. Plate 84 then similarly has an evaporation face in opposed relationship to condensing face on rejection or transfer plate 86.

Each of the plates having a condensation face also has at the lower end thereof a condensation collection trough. For example, plate 78 is provided with a trough 88, plate 80 with a trough 90, plate 82 with a trough 92, plate 84 with a trough 94 and plate 86 with a trough 96. These troughs, as in the previous embodiment collect the condensate running collected on and condensed on the condensing face and running down the vertically disposed plate. The troughs then convey the collected condensate or product to a suitable manifold for recovery of the product. These troughs are similarly disposed as in the previous embodiment to avoid the contamination of the product by the film of feedwater or waste water flowing down the surface of the evaporating face. The upper ends of the openings into the troughs can be slightly smaller than the remaining portion of the trough. The plates as in the previous embodiment are closely spaced and spacing selected in accordance with the particular other parameters such as the environmental conditions established inside the vessel.

A suitable feed or supply reservoir 98 is disposed at the upper end of the unit and in communication as previously described with the vapor chambers between the spaces to feed the supply of feed liquid onto the evaporating face of the respective plates. A waste collection reservoir 100 is disposed at the lower end of the unit, to collect the waste liquid which runs off the lower edge of the faces of the vertically disposed plates. The waste from the reservoir 100 can be recirculated or recycled or can be simply disposed of as waste as desired.

In the preferred form of the invention, the plate 86 forms a heat exchanger or portion of a heat exchanger for cooling the last plate and rejecting heat from the unit into a suitable sump. In this connection a simplified heat exchanger is illustrated wherein a supply of cooling water is supplied through a conduit 102 which passes into cooling manifold 104 and from there into a series of conduits or liquid passages 106 in heat exchange contact with the plate 68. The fluid then passes into a collection manifold 108 and from there is disposed of by way of conduit 110 into a sump.

It is possible with proper manifolding etc. to use some of this rejected heat to pre-heat the feed water. This would make optimum use of the energy or heat supplied to the system in that the feed water or liquid is pre-heated to an optimum temperature before being introduced into the system. The feed water is then fed in a controlled manner onto the evaporated faces of the various plates as heat is introduced into the system into the heat input chamber 72.

As previously discussed this heat can be introduced in any suitable manner, such as by steam or the like, through a heat exchanger, or electrical energy or any other suitable source of heat. For simplicity and illustrative purposes, a pair of electrical heating elements 112 are illustrated which introduces heat from an electrical source into water in the chamber 72. The heat vaporizes the water which condenses on the faces of the plates 74 transferring heat thereto which is transferred through the plate onto the evaporating surfaces and into the thin film of liquid flowing down that surface. A condition can be established with a proper number of plates or effects wherein a high energy input is provided such that up to 50% of the feed water fed into the system is evaporated from the feed water before the feed water passes off the lower edge of the plate. This requires a high flux feed input and optimum control of the system for optimum balance. With such a system, a very high percentage of the feed water can be evaporated in the first pass through the system. Additionally, this can be accomplished with a fairly low number of effects or plates.

Figure 7:
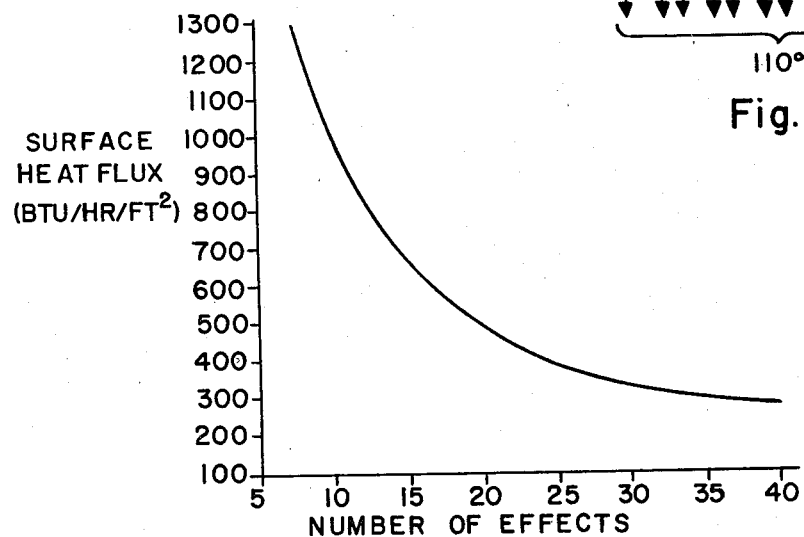
FIG. 7 is a graph showing the effect of surface heat flux vs. the number of effects or plates.

The relationship between the surface heat flux and the number of plates required is illustrated by the curve in FIG. 7. With a very high heat flux, a very low number of plates can be utilized to achieve successful and efficient results. With such a system the establishment of a sufficiently high heat flux and the optimum number of plates, only a single pass through the system may be necessary to remove the desirable components from the water.

The larger number of plates will result in a more efficient use of the energy source by the larger number of recoveries within the system. Therefore, the system becomes more efficient (in terms of energy utilization) with increasing number of effects.

The above described embodiment may be said to be a double unit with a pair of opposed identical sets of plates arranged such that the heat input chamber is disposed adjacent to the input plates. With a unit of this type and having means for adjusting the heat input to maximum advantage, a system of this arrangement and design can remove up to 50% of the water from a charge of sea water passing along the plates. This 50% of the water can be removed in a single pass. This is achieved by optimum adjustment of the water flow rates and the heat flux across the plates. In addition, as previously pointed out, the minimum number of plates can be used with a system of this type. The further advantages of the invention are that compact systems can be made to supply the daily water supply for an average household. Such a unit would fall within a range of approximately 8 inches square, and approximately 18 inches high. Nominal changes and dimension may be required for various housing components and mounting assemblies as well as other required components, such as insulation and the like.

Further advantages of the invention are that banks of the units can be arranged as shown in FIG. 6. Turning to FIG. 6 there is schematically illustrated a plurality of banks of distillation units in accordance with the invention. A top plan view, for example, shows the illustrated system comprising a first pair of units 112 and 114 disposed adjacent and utilizing a common heat input chamber 116. The unit 114 then is adjacent to a unit 118 and shares with that unit a common heat output sink or chamber 120. Similarly, a heat input unit or chamber 122 is shared between units 118 and 124. A unit 126 then shares a common heat output unit at 128 with unit 124. Similarly a further heat input unit 130 is common to units 126 and unit 132. Thus, any number of units can be constructed and arranged in a continuous sequence, alternating pairs of the units around a common heat input unit. The heat output units are preferably heat exchangers which can be arranged to preheat the feed water into the system or heat simply discharged to a sump.

It has been calculated that a system in accordance with this arrangement the size of a standard railway box car can supply upwards from a 250–300,000 gallons per day of fresh water from seawater. Such units could be mobile and could be moved to and from areas where brackfish or salt water supplies are available for the transformation of such water into potable water.

These systems can also be utilized in factories, such as oil refineries and the like, chemical refineries and manufacturing facilities for the separation of various phases of liquids, such as the various components of crude oil and the like. Appropriate adjustment in size of the unit heat input and control of the heat flow and liquid flow through the unit provides an optimum efficiency of the units.

As previously discussed, the number of plates or effects through the system vary, preferably with the heat flux of the system. As illustrated in FIG. 7, there is plotted the surface heat flux in BTU per hour per square foot, against the number of effects. It will be seen that for low energy systems, such as with flat plate solar collectors, heat flux on the order of 200 BTU per hour per square foot, could utilize up to 40 or more plates or effects. Similarly, when the heat flux approaches 900 BTU per hour per square foot, such as obtainable from generating or processing plants for example, a unit of 10 effects or plates, or less may be utilized. The heat flux (rate of transfer) will depend on the temperature differential across the system from the heat input side to the heat output side. The maximum temperature of the input plate will depend upon the boiling point of the liquid fed through the system. The temperature of the heat output plate of the system will depend upon the temperature of the sump. The greater the number of plates (i.e. effects) the more efficient the use of the energy.

Figure 8:
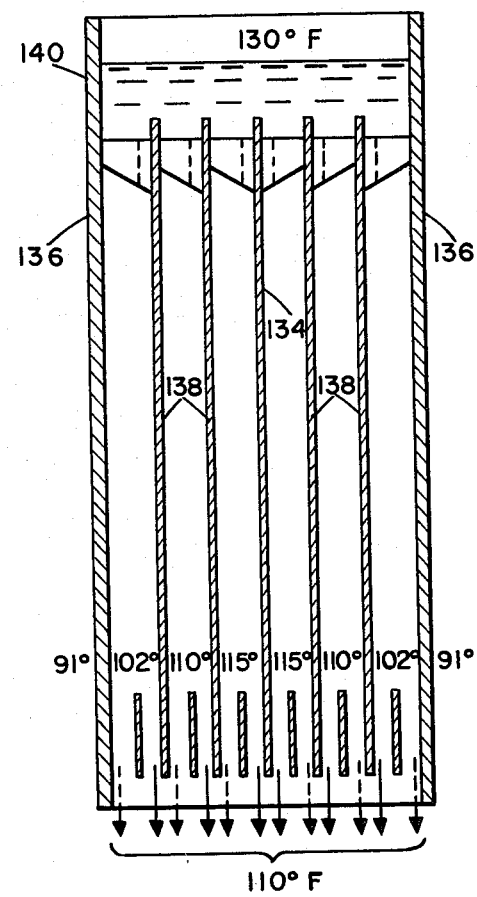
FIG. 8 is a further embodiment of the invention.

Turning now to FIG. 8, there is illustrated a further embodiment of the invention which simply utilizes the heat of the water itself, or liquid being fed onto the system for the distillation process. In this unit, a central plate 134 is disposed in the center of the unit with a pair of heat rejection plates 136. Disposed between the center heat input plate and the heat rejection plates plates are a plurality of identical plates 138 each having the previously described evaporation and condensation faces similarly disposed in opposed relationship to an opposite plate of an adjacent plate. With this arrangement, feed water at for example 130° is placed in the input reservoir 140 and feeds down through the usual feed system onto the evaporating faces of the respective plates. The heat within the water or liquid itself when drawn in a thin film over the faces of the plates will vaporize and condensate on the faces of the adjacent plates. The vapor condensation on the adjacent plate will similarly transfer the heat to and through that plate to the opposite face thereof. The heat differential or gradient will be established automatically as a result particularly of the heat output from plates 136 and 138 when the high temperature water is introduced into the system. Thus, the process of evaporation and condensation will take place as previously described. Such units, can for example be utilized for waste water at utility power plants and the like or can be utilized in place of cooling towers and the like with the resultant use of the energy from the waste water for distillation of brackish water, waste water or any other liquids available. The outer plates 136 can be cooled by a source of air and can include radiation fins and the like or can be cooled by a heat exchanger which transmits the heat therefrom into further feed water.

Turning now to FIGS. 9 and 10 of the drawings there is illustrated a further embodiment of the invention wherein the plates are concentric in arrangement and are circular in configuration. With this arrangement in inner plate 142 or the like of a circular or tubular configuration becomes the input plate and the outer circular plate 144 becomes the output plate. Intermediate plates 146 and 148 each include the usual evaporation and condensation faces in opposed relationship to opposite faces on adjacent plates. With this arrangement, the heat input would be at the center of the unit with the heat flowing radially outward across the circular vapor chambers to the next larger circular plate. With this arrangement, the outer plate has a much larger radiating surface for the radiation of the heat from the system. Again, this heat from the circular plate however, may be recovered by use in pre-heating through a heat exchanger the feed water into the system. Such circular systems may have numerous advantages in certain applications. Certain design modifications may be necessary in some instances to control the thickness of the thin film of water or other liquid on the evaporating faces on the various plates.

Certain advantages of this configuration include the increasingly larger surfaces outward from the central input plate. This has significant advantages when very high temperatures or heat input at the center is contemplated.

Turning to FIG. 11, there is illustrated a diffusion distillation heat exchanger which embodies certain principals of the invention and which can be readily utilized with other systems incorporating the present invention. This illustrated embodiment is also suitable for either straight distillation with proper interconnection and for simply heat exchanging with other arrangements. In this arrangement, the device comprises a plurality of vertically disposed plates 150 spaced apart with a liquid conducting coil 152 arranged for example in a serpentine arrangement disposed between the plates 150 with an inlet conduit 154 at the bottom and an outlet conduit 156 at the upper end. The plates 150 are spaced apart as in the previous embodiments with a spacer 158 with a reservoir of liquid 160 disposed to feed the liquid in a thin film along the faces of the plates 150. The liquid as it flows along the face of the plate in a very thin film, quickly evaporates or vaporizes and diffuses across the space condensing on the coils of the tube 152. This transfers heat to the coils of the tubing and to the liquid flowing through the tubing. The condensate on the outer surface of the tubes fall downward and is collected in a reservoir 162 and is then fed by suitable conduit means 164, by way of a heat exchanger 166, to ultimate collection and use.

The feed water or liquid flowing along the faces of the plates 150 flows off the lower end thereof and is collected in a trough or reservoir 168. This water then passes either through heat exchanger 166 by way of conduit 170, or by way of pump 172 back through the main heat exchanger. Feed water into the system passes by way of an inlet conduit 174 through the heat exchanger 166, which recovers heat from waste water and the product water, bringing its temperature down to approximately 130° and raising temperature of the feed water, which starts for example at 60° F. up to 95° F. as it passes through conduit 176 into the conduit 154 back through the coils 152. If used primarily as a distillation system as in the illustrated embodiment, the feed water is heated to an optimum temperature of approximately 210° F. by the addition of additional energy or heat prior to passing the feed water back into the feed trough at 160. In the illustrated embodiment, the water begins at the upper end at 210° F. and passing through the system. The product or recovered water passes out of the system at 160° at the lower end of the unit and through the heat exchanger passing therefrom at approximately 130°. The product or feedwater passes into the coils at approximately 160° and reaches approximately 205° at the top end of the coil passing out of the coil back into the feed water with the introduction of sufficient heat to bring the temperature up to 210° F.

The basic of this system can simply be used as a heat exchanger for recovery of some components of waste liquid from a system and the transfer of heat from the waste liquid to the feed water of the system. For example, a system such as illustrated can be used in place of the heat exchanger at 22 for example, in FIG. 2.

Figure 12:
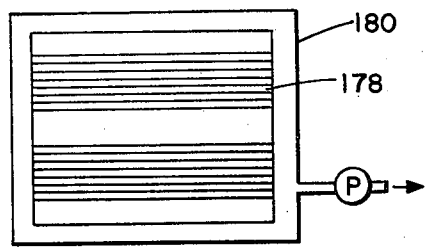
FIG. 12 is a schematic view of a system with diffusion control.

Turning now to FIG. 12 there is illustrated a further modification of the invention wherein a distillation unit 178 such as previously described is enclosed within a gas type chamber or housing 180 for controlling the pressure and the amount of air within the system. It is important to appreciate that one advantage of the present invention is that it can be carried out at atmospheric pressures in the presence of atmospheric air without special pressure chambers and support structures for the evaporating plates and surfaces. In the presence of atmospheric air, the pressure equalizes on the plate and the vapor pressure of the distilled liquid passes through the air between the plates, thus the pressure therein consists of the vapor pressure and partial atmospheric pressure. With a system such as schematically illustrated in FIG. 12, the atmospheric pressure can be reduced within the system, however, maintaining equal pressure on both sides of the plate, thus again avoiding the necessity for special support structures and the like. This reduction of the atmospheric pressure permits the vapor pressure to rise, equalizing the pressure therein such that a faster diffusion occurs across the space between the vaporating and condensing plates. This can increase the production rate of the system.

Figure 13:
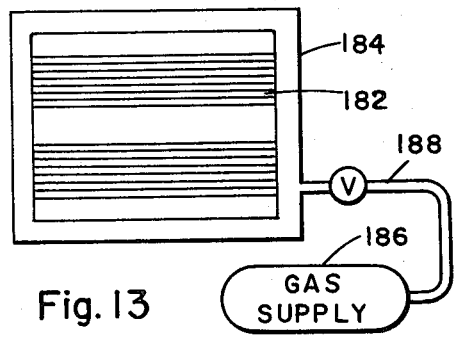
FIG. 13 is a view like FIG. 12 of an alternate diffusion control.

In a similar manner, turning now to FIG. 13, a unit 182 is illustrated enclosed within a pressure chamber 184 (more particularly a gas-tight vessel) to which is supplied a selected gas from a source 186 by way of a control conduit 188. With this arrangement, a gas having a higher diffusion co-efficient can be introduced into the system, thus again increasing the rate of diffusion across the space between the plate, and thus increasing productivity of the system. Thus, the parameters within the system can be varied to achieve various desired results or can be varied to balance or offset other variables within the system. It is also important to note that the thickness of the thin film will depend on the viscosity of the liquid making up the film. Higher viscosity will in general, require thicker film. It should again be emphasized that the system of the present invention does not require high pressure vessels or structures.

While I have illustrated and described my invention by means of several specific embodiments, it is to be understood that numerous changes and modifications may be made therein without departing from the spirit and scope of the invention, as defined in the appended claims.

We claim:

1. A multiple effect distillation unit, said unit comprising:
    a plurality of heat conducting plates including a primary heat input plate and a heat output plate, and at least one intermediate plate, said heat input plate having an evaporation surface and said heat output plate having a condensing surface, said intermediate plate having both evaporation surfaces and condensing surfaces, said plates being disposed in a closely spaced parallel face to face arrangement of one-half inch or less apart having alternately evaporating and condensing faces in opposed face to face relation defining a vapor chamber therebetween, said plates disposed substantially vertically for defining an upper end and a lower end for enabling gravity flow of a liquid from said upper end to said lower end, means for introducing a liquid feedstock onto the evaporator surfaces at the upper end thereof at a controlled rate for establishing a thin film flow of said liquid along said evaporator face from the upper end to the lower end, and means for establishing a heat flow from said heat input plate through the intermediate plate to the heat output plate, and means for separately collecting the distillate at the lower end of said plates.

2. The distillation unit of claim 1 wherein the means for establishing the heat flow includes a source of heat for said heat input plate and means for cooling said heat output plate.

3. The distillation unit of claim 2 wherein each evaporating face includes a plurality of ribs extending along the length thereof.

4. The distillation unit of claim 3 wherein the spacing between said plates is no greater than three-sixteenths of an inch.

5. The distillation unit of claim 4 including a pair of centrally disposed heat input plates disposed face to face and a pair of heat output plates disposed on opposite sides of said heat input plates with a plurality of intermediate plates disposed between each one of said heat input plates and each one of said heat output plates.

6. The distillation unit of claim 5 including a common source of heat for said heat input plates.

7. The distillation unit of claim 6 wherein said means for cooling said heat output plate includes a heat exchanger and a source of liquid flowing through said heat exchanger.

8. The system of claim 5 wherein said source of heat is electrical.

9. The system of claim 5 wherein said source of heat is hot water.

10. The multiple effect distillation system of claim 1 comprising:

a non-condensing gas disposed between said plates so that the partial pressure of said non-condensing gas and the partial pressure of said vapor establish a fixed total pressure on all of said plates.

11. The system of claim 1 comprising at least ten heat transfer plates.

12. The system of claim 11 wherein the spacing between said plates is no greater than three-sixteenths of an inch.

13. A process for the distillation liquid comprising the steps of:

arranging heat transfer plates vertically in opposed parallel face to face relationship having a spacing of one-half inch or less therebetween, establishing a heat differential between said plates, flowing a thin film of a liquid down the face of the higher temperature plates thereby evaporating part of said liquid film, and condensing the resultant vapor onto the opposed face of the adjacent plate and separately collecting and recovering the distillate at the lower end of said plates.

14. The process in accordance with claim 13 wherein the step of establishing said temperature differentials include supplying heat to one outermost plate and removing heat from another outermost plate.

15. The process in accordance with claim 13 wherein said plates are selected to number between 5 and 50.

16. The process in accordance with claim 15 wherein said plates are arranged with a spacing of no greater than three-sixteenths of an inch.

17. The process of claim 13 including the step of altering the coefficient of diffusion between said plates.

18. The process of claim 13 including the step of preheating said liquid to approximately its boiling point before introduction into said system.

19. A process in accordance with claim 13 including the step of arranging said plates in alternate banks having alternately opposed input and output plates and a plurality of plates between said input and output plates, the step of application of heat to said plates includes the step of simultaneously applying heat to said input plates from a common source.

20. The multiple effect distillation system of claim 13 comprising the step of:

introducing a noncondensing gas disposed between said plates so that the partial pressure of said noncondensing gas and the partial pressure of said vapor establish a fixed total pressure on all of said plates.

* * * * *